Figure 1:
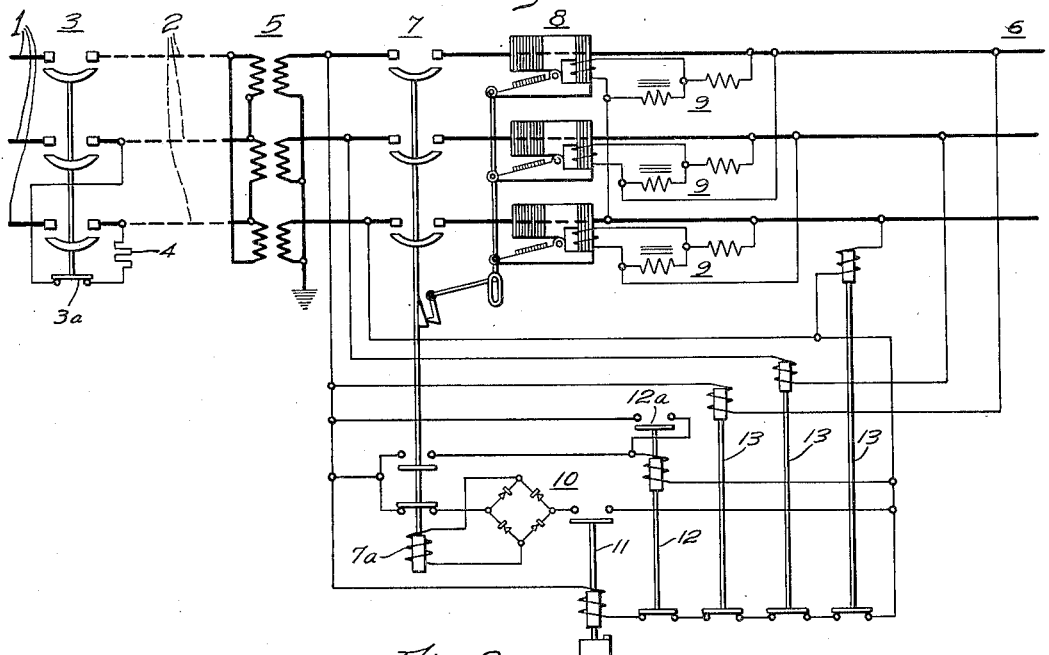

Oct. 22, 1935.   J. S. PARSONS ET AL   2,018,226

SIMPLIFIED NETWORK PROTECTOR

Filed May 19, 1934

WITNESSES:

INVENTORS
John S. Parsons &
Rolla E. Powers.
BY
ATTORNEY

Patented Oct. 22, 1935

2,018,226

UNITED STATES PATENT OFFICE 2,018,226

SIMPLIFIED NETWORK PROTECTOR

John S. Parsons, Swissvale, and Rolla E. Powers, Verona, Pa., assignors to Westinghouse Electric & Manufacturing Company, East Pittsburgh, Pa., a corporation of Pennsylvania Application May 19, 1934, Serial No. 726,575

7 Claims. (Cl. 175—294)

Our invention relates to protective apparatus for electric systems and particularly to automatic network protectors for use in alternating-current network distribution systems.

It has heretofore been the practice, in such systems, to provide power directional relay apparatus for each network circuit breaker for tripping the breaker upon the occurrence of power flow from the network to the feeder, and for reclosing the breaker upon the occurrence of such a relationship of feeder and network voltages as to insure power flow from the feeder to the network immediately after the reclosure of the breaker. In order to permit the entire disconnection of an individual feeder at times of light load, it has been the practice to adjust the power-directional network relays to respond to a reverse power flow of comparatively low value, for example 1% of normal full load, so that upon opening the feeder circuit breakers, the reverse power flow occasioned by magnetizing losses to the network transformers will be sufficient to effect operation of the network relays and disconnection of the feeder.

With such a sensitive reverse power adjustment, it has been necesary to make an accurate comparison of feeder and network voltages, as to both magnitude and phase position, in order to prevent "pumping", i. e., repeated opening and reclosing of a protector circuit breaker under conditions where the relationship of feeder and network voltages is such as to satisfy the network relay closing characteristics, and at the same time permit the flow of reverse power after closure of the protector circuit breaker. In order to prevent this condition, it is often necessary to provide an additional phasing relay, which operates to limit the range of feeder voltage values, with reference to network voltage, which will effect closure of the breaker. The rather complicated relay connections and the extreme accuracy of relay operation required in such arrangements have resulted in rather high network protector costs.

As alternatives to the rather expensive system described above, a number of simplified systems have been proposed. According to one such arrangement, it is proposed to reclose the protectors in response to feeder voltage only, and to provide means for locking a protector circuit breaker in open position, after it has been opened, until the feeder is completely deenergized. In this way pumping may be avoided, as the protectors first to open cannot reclose until all the other protectors connected to the feeder have opened. However, such simplified arrangements have never come into commercial use for the reason that, without phasing, there is danger of short-circuits being established because of crossed-phase connections, which may be accidentally made by workmen in repairing a faulted feeder. As such short-circuits could not be cleared by the protective apparatus, it would be necessary to block open all of the protectors connected to a feeder when repairing a fault on the feeder, and to check the voltages across a number of protectors, after the fault has been repaired, in order to insure that the correct phase connections had been made.

It is an object of our invention to provide a novel network system which shall possess the advantages of the simplified arrangements mentioned above, but which shall avoid the necessity of an elaborate phase checking operation after every feeder fault.

Another object of our invention is to provide a novel arrangement for preventing the closure of a network protector in the event of incorrect phase connections only, of general utility in the network art.

Figure 2:
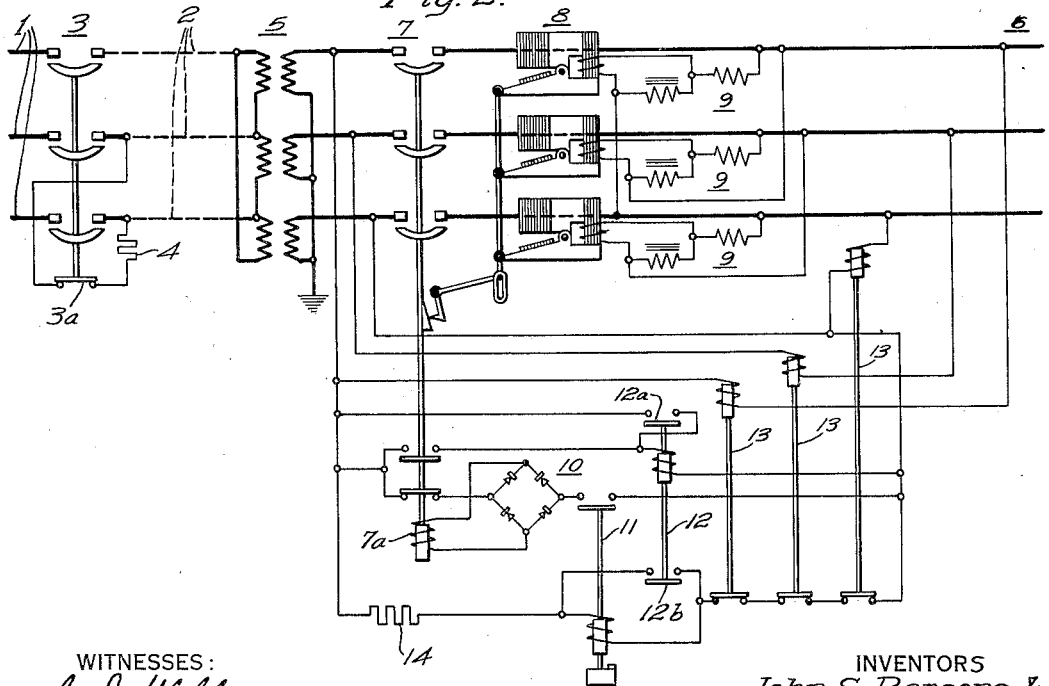

Other objects of our invention will become evident from the following detailed description, taken in conjunction with the accompanying drawing, in which, Figure 1 is a diagrammatic view of a network protector and associated apparatus, embodying our invention; and Fig. 2 is a diagrammatic view of a modification of the protector shown in Fig. 1.

In accordance with our invention, the sensitive power directional network relay is eliminated, and some simplified and less sensitive form of fault responsive element substituted, which will operate in response to an abnormal electrical condition of the feeder but not in response to reverse transformer magnetizing losses nor to faults in the network. A number of devices operable in response to conditions on either side of the network transformers are suitable for this purpose, as will be apparent to those skilled in the art.

In order to effect the entire disconnection of an individual feeder, we provide any suitable means for artificially establishing the particular abnormal condition to which the network protector fault-responsive elements respond, when the feeder breaker is open. The reclosure of the network protectors, in accordance with our invention, is effected without phasing, as this term is generally understood, by means of a simple arrangement of voltage responsive relays. These relays operate to permit closure of the protector when the feeder is energized and no crossed phase condition between feeder and network voltage exists. As the protector circuit breakers are prevented from reclosing when a crossed-phase condition exists, it is unnecessary to check voltages as in the lock-out system mentioned above.

In applications of our invention in which closing and tripping conditions can exist simultaneously, we preferably provide a lock-out device for preventing the reclosure of a network circuit breaker, after opening thereof, until the feeder is completely deenergized, as in the lock-out system of the prior art, mentioned above.

Referring to Fig. 1 of the drawing, an alternating-current supply circuit 1 is arranged to be connected to a feeder 2 by means of a feeder circuit breaker 3. The feeder circuit breaker 3 is arranged to be opened, in the event of a fault on the feeder 2, by means of the usual protective relay apparatus, which has not been shown in the drawing, as it is well known in the art and forms no part of the present invention. Suitable apparatus, shown, for simplicity, as a resistor 4 and back contacts 3a of the feeder circuit breaker 3, is provided for establishing an artificial abnormal condition on the feeder 2, for causing network protectors supplied by the feeder 2 to open in response to opening of the feeder breaker 3.

A transformer bank 5, supplied from the feeder 2, is arranged to be connected to a network load circuit 6 by means of a network circuit breaker 7. Although only one transformer bank 5 is shown, it will be understood that in a commercial embodiment of the invention, a large number would be provided, connected in parallel between the feeder 2 and the network 6 and controlled by individual network circuit breakers, in accordance with the usual practice. The transformers 5 are shown connected in delta on the feeder side and in star on the network side, but may be connected in other ways familiar to those skilled in the art.

A non-sensitive fault-responsive element 8 is provided for causing the network circuit breaker 7 to open in response to a fault on the feeder 2. The element 8 may be of any type which will respond to a fault on the feeder but not to a fault on the network, nor to the reverse power flow occasioned by the magnetizing losses of the transformer bank 5. In the arrangement shown, the element 8 is a power directional direct-trip device of the type disclosed in the copending application of Myron A. Bostwick, Serial No. 736,022, filed July 19, 1934, and assigned to the Westinghouse Electric & Manufacturing Company. As explained in the Bostwick application, the direct-trip device 8 responds to reverse power flow above a predetermined value. In the practice of our invention, we prefer to adjust the device 8 to respond to a comparatively high reverse power value, such as 100% of the rated load of the transformer bank 5. Suitable impedances 9 are connected in the impedance circuits of the direct-trip device for purposes explained in the above-mentioned Bostwick application. As the details of the device 8 and its connections form no part of the present invention, a detailed description is believed unnecessary, and the device 8 will be considered simply as a power-directional fault responsive element operable in response to a reverse power value of 100% rated transformer capacity.

The network circuit breaker 7 is provided with a closing solenoid 7a, preferably supplied with direct-current by means of a set of rectifiers 10. A contactor 11, designed to close with a short time delay in response to a voltage of the order of 85% of normal phase-to-phase voltage, is provided for controlling the circuit of the closing solenoid 7a. A lock-out relay 12, and a set of voltage-responsive relays 13 are provided for preventing the completion of an energizing circuit for the contactor, except after a complete loss of voltage of the feeder, and when no crossed phase condition exists between the secondary voltage of the transformer bank and the voltage of the network.

The lockout relay 12 is designed to drop out at a very low voltage, such as 10% of normal phase-to-phase voltage or lower, and to close at a higher voltage such as 60% of normal phase-to-phase.

The voltage responsive relays 13 are designed to operate at a voltage higher than normal phase-to-ground voltage, but lower than normal phase-to-phase, for example, at a value of 130% of normal phase-to-ground, and are connected across the main contacts of the network circuit breaker 7.

The operation of the apparatus shown in Fig. 1 may be set forth as follows: Assuming that the supply circuit 1 is energized, and the various elements are in the positions shown, the feeder breaker 3 may be closed to connect the supply circuit 1 to the network 6. Upon closure of the feeder breaker 3, the transformer bank 5 becomes energized and develops a secondary voltage.

If the network 6 is deenergized, the maximum voltage which can be impressed on the relays 13 is approximately 100% of normal phase-to-ground voltage. If the network 6 is energized, however, and the conductors of the feeder 2 are connected in proper sequence, the voltage applied to the relays 13 will be quite small. In either case, therefore, the relays 13 all remain in deenergized position, and a circuit for the contactor 11 is completed. As the voltage applied to the latter is above the 85% value to which it responds, the contactor 11 closes to complete a circuit for the closing solenoid 7a.

The network circuit breaker 7 accordingly closes, to connect the transformer bank 5 to the network 6, and to complete an energizing circuit for the lockout relay 12. The lockout relay 12, in closing, establishes a holding circuit for itself through its contacts 12a.

If a fault occurs on the network 6, the direction of power flow is such as to prevent operation of the direct trip device 8, and the circuit breaker 7 remains closed. The fault is accordingly burned off in the usual manner.

If a fault occurs on the feeder 2, however, the direction of power flow reverses, and the direct-trip device 8 operates to trip open the network circuit breaker 7. The opening of the network circuit breaker 7 does not cause the lockout relay 12 to drop out, however, because of the holding circuit through the contacts 12a. When the feeder 2 has become completely deenergized by the opening of all network protectors supplied therefrom and by the opening of the feeder breaker 3, the lockout relay 12 drops out to complete a circuit for the contactor 11. However, as no voltage is available from the deenergized feeder 2, the contactor 11 remains open until feeder voltage is restored.

It will be noted that for even the most severe fault conditions on the feeder 2, the impedance drop in the transformer bank 5 is always available to hold the lockout relay 12 closed. The impedance relationships of a network system are such that at least 30% or 40% of normal voltage is always available on the low voltage side of the transformers for any fault condition which can occur on the feeder side.

Returning to the operation of Fig. 1, after the fault on feeder 2 has been repaired, and the feeder breaker 3 reclosed, the network circuit breaker 7 recloses in the manner previously described, if the feeder connections have been properly made. If any of the feeder conductors have been transposed, or if all three feeder conductors have been rotated 120° or 240°, however, a voltage of approximately 173% normal phase-to-ground voltage will be impressed across one or more of the voltage-responsive relays 13, and the energized relay or relays will operate to open position. Reclosure of the contactor 11 and network circuit breaker 7 will accordingly be prevented until proper feeder connections are made.

Fig. 2 shows a modification of the arrangement shown in Fig. 1. In Fig. 2, a resistor 14 is included in series with the coil of contactor 11, and the lockout relay 12 is provided with front contacts 12b for short-circuiting the contactor 11. The remaining elements of Fig. 2 are the same as the corresponding elements of Fig. 1 and are designated by the same reference numerals. The operation of the modification shown in Fig. 2 will be obvious from that described above in connection with Fig. 1.

We do not intend that the present invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In an alternating-current system of transmission and distribution, a polyphase supply circuit, a polyphase load circuit, a circuit breaker for connecting said circuits, control means for said circuit breaker operable to cause opening thereof in response to a fault on said supply circuit and to cause closure thereof in response to a predetermined normal condition of energization of said supply circuit, and means responsive to voltage conditions derived from both of said circuits and operable only in the event of incorrect phase connections of one of said circuits for preventing closure of said circuit breaker.

2. In an alternating-current network system of distribution, a polyphase feeder circuit, a polyphase network load circuit, transformer means energized from said feeder circuit, a circuit breaker for connecting said transformer means to said network circuit, control means for said circuit breaker operable to cause opening thereof in response to a fault on said feeder circuit and to cause closure thereof in response to a predetermined normal condition of energization of said feeder circuit, and means responsive to voltage conditions derived from both of said circuits and operable only in the event of incorrect phase connections of one of said circuits for preventing closure of said circuit breaker.

3. In an alternating-current network system of distribution, a polyphase feeder circuit, a grounded-neutral polyphase network load circuit, transformer means energized from said feeder circuit, said transformer means having a grounded-neutral polyphase secondary circuit, a circuit breaker for connecting said secondary circuit to said network circuit, control means for said circuit breaker operable to cause opening thereof in response to a fault on said feeder circuit and to cause closure thereof in response to a predetermined normal condition of energization of said feeder circuit, and a plurality of voltage-responsive relays connected across the main contacts of said circuit breaker and operable at voltage values higher than the normal phase-to-neutral voltage of said network circuit and lower than the normal phase-to-phase voltage of said network circuit to prevent closure of said circuit breaker in the event of an incorrect phase connection between said feeder circuit and said network circuit.

4. In an alternating-current network system of distribution, a polyphase feeder circuit, a polyphase network load circuit, transformer means energized from said feeder circuit, a circuit breaker for connecting said transformer means to said network circuit, control means for said circuit breaker operable to cause opening thereof in response to a fault on said feeder circuit and to cause closure thereof in response to a predetermined normal condition of energization of said feeder circuit, said control means including lockout means for preventing reclosure of said circuit breaker after opening thereof until said feeder circuit has been deenergized to a predetermined degree, and means responsive to voltage conditions derived from both of said circuits and operable only in the event of incorrect phase connections of one of said circuits for preventing closure of said circuit breaker.

5. In an alternating-current network system of distribution, a polyphase feeder circuit, a feeder circuit breaker for controlling the flow of power through said feeder circuit, a polyphase network load circuit, transformer means energized from said feeder circuit, a network circuit breaker for connecting said transformer means to said network circuit, control means for said network circuit breaker operable to cause opening thereof in response to a fault on said feeder circuit and to cause closure thereof in response to a predetermined normal condition of energization of said feeder circuit, said control means including lockout means for preventing reclosure of said network circuit breaker after opening thereof until said feeder circuit has been deenergized to a predetermined degree, means effective when said feeder circuit breaker is open for artificially establishing said abnormal condition of said feeder circuit to cause said network circuit breaker to open, and means responsive to voltage conditions derived from both of said circuits and operable only in the event of incorrect phase connections of one of said circuits for preventing closure of said network circuit breaker.

6. In a network protector for controlling the connection of a polyphase supply circuit and a polyphase network circuit, a network circuit breaker having electromagnetic closing means, a closing circuit therefor, normally operable means for completing said closing circuit in response to a closing condition, and means responsive to voltage conditions derived from both of said circuits and operable only in the event of incorrect phase connections of one of said circuits for interrupting said closing circuit.

7. In a network protector for controlling the connection of a polyphase grounded-neutral supply circuit and a polyphase grounded-neutral network circuit, a network circuit breaker having electromagnetic closing means, normally operable means for completing said closing circuit in response to a closing condition, and a plurality of voltage-responsive relays connected across the main contacts of said circuit breaker and operable at voltage values higher than the normal phase-to-neutral voltage of said network circuit and lower than the normal phase-to-phase voltage of said network circuit for interrupting said closing circuit only in the event of interchanged voltage phases of one of said circuits.

JOHN S. PARSONS.
ROLLA E. POWERS.